United States Patent
Kim

(10) Patent No.: US 12,407,179 B2
(45) Date of Patent: Sep. 2, 2025

(54) ELECTRONIC DEVICE FOR SUPPORTING CONNECTION WITH EXTERNAL DEVICE AND OPERATING METHOD THEREOF

(71) Applicant: Samsung Electronics Co., Ltd., Gyeonggi-do (KR)

(72) Inventor: Sangju Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 509 days.

(21) Appl. No.: 17/896,484

(22) Filed: Aug. 26, 2022

(65) Prior Publication Data

US 2022/0407340 A1    Dec. 22, 2022

Related U.S. Application Data

(63) Continuation of application No. PCT/KR2022/005145, filed on Apr. 8, 2022.

(30) Foreign Application Priority Data

May 31, 2021    (KR) ........................ 10-2021-0070032

(51) Int. Cl.
    H02J 7/00    (2006.01)
(52) U.S. Cl.
    CPC .... *H02J 7/007182* (2020.01); *H02J 7/00034* (2020.01); *H02J 7/0042* (2013.01)
(58) Field of Classification Search
    None
    See application file for complete search history.

(56) References Cited

U.S. PATENT DOCUMENTS 10,320,180 B1 *  6/2019  Venigalla ........... H01R 13/6683
2013/0082644 A1   4/2013  Gagne et al.
(Continued)

FOREIGN PATENT DOCUMENTS

JP    2012-185661 A    9/2012
KR    10-2013-0074055 A    7/2013
(Continued)

OTHER PUBLICATIONS

International Search Report dated May 31, 2021.

*Primary Examiner* — Arun C Williams
(74) *Attorney, Agent, or Firm* — Cha & Reiter, LLC.

(57) ABSTRACT

According to an example embodiment, an electronic device includes: a universal serial bus (USB) power delivery integrated circuit (PDIC) configured to determine whether a first pin of a USB port of the electronic device is connected to a power delivery (PD) source; a charging circuitry configured to charge a battery of the electronic device with power supplied from the PD source through a second pin of the USB port; a memory configured to store computer-executable instructions; and a processor configured to execute the instructions by accessing the memory. When the USB PDIC determines that the first pin and the PD source are connected, the instructions may cause the processor to control a voltage of the second pin to be less than a threshold voltage while maintaining communication between the USB PDIC and the PD source through the first pin based on a state of the electronic device. In addition, various example embodiments may be possible.

17 Claims, 8 Drawing Sheets

(56) References Cited

U.S. PATENT DOCUMENTS

| | | |
|---|---|---|
| 2016/0308452 A1 | 10/2016 | Motoki |
| 2018/0239410 A1 | 8/2018 | Paparrizos et al. |
| 2019/0004584 A1 | 1/2019 | Nge et al. |
| 2020/0034153 A1 | 1/2020 | Halle |
| 2022/0077783 A1* | 3/2022 | Khamesra ........... H02M 1/0019 |

FOREIGN PATENT DOCUMENTS

| | | |
|---|---|---|
| KR | 10-2017-0056002 A | 5/2017 |
| KR | 10-2017-0098461 A | 8/2017 |
| KR | 10-2018-0088651 A | 8/2018 |
| KR | 10-2021-0014356 A | 2/2021 |

* cited by examiner

ELECTRONIC DEVICE FOR SUPPORTING CONNECTION WITH EXTERNAL DEVICE AND OPERATING METHOD THEREOF

CROSS-REFERENCE TO RELATED APPLICATIONS

This application is a continuation of International Application No. PCT/KR2022/005145 designating the United States, filed on Apr. 8, 2022, in the Korean Intellectual Property Receiving Office and claiming priority to Korean Patent Application No. 10-2021-0070032, filed on May 31, 2021, in the Korean Intellectual Property Office, the disclosures of which are incorporated by reference herein in their entireties.

BACKGROUND

1. Field

The instant disclosure generally relates to an electronic device that supports connection with an external electronic device and a method of operating the electronic device, and more particularly, to an electronic device that receives power supplied through a universal serial bus (USB) port and a method of operating the electronic device.

2. Description of Related Art

Various electronic devices such as smartphones, tablet personal computers (PCs), portable multimedia players (PMPs), personal digital assistants (PDAs), laptop PCs, and wearable devices have become popular. These various electronic devices typically have ports that are used for connecting with external electronic devices via wires. The ports are specified according to various standards. Among such various standards, the universal serial bus (USB) standard is the most widely used.

USB is an input/output standard used to connect an electronic device and an external electronic device. Recently, with the introduction of USB Type-C power delivery (PD) technologies, one electronic device may receive power from a USB-connected PD source.

SUMMARY

When an electronic device is connected to a power delivery (PD) source via a universal serial bus (UBS) Type-C port, the configuration channel (CC) line defined in the USB Type-C standard may be physically connected to a pull-up resistor Rp and a pull-down resistor Rd, and virtual bus (VBUS) voltage, which is the output voltage of the PD source, may become 5 volts (V) or greater, so that the electronic device and the PD source may communicate through the CC line.

When the VBUS voltage of the PD source becomes 5 V, voltage required by the electronic device may be output through the CC line, and 20 V may be output.

In existing USB Type-C, CC communication may be possible only when the minimum VBUS voltage of 5V is maintained. In other words, the VBUS voltage of 5 V may need to be maintained at all times even though the VBUS voltage is not required, and accordingly standby power may continue to be consumed.

According to an example embodiment, an electronic device includes: a USB power delivery integrated circuit (PDIC) configured to determine whether a first pin of a USB port of the electronic device is connected to a PD source; a charging circuitry configured to charge a battery of the electronic device with power supplied from the PD source through a second pin of the USB port; a memory configured to store computer-executable instructions; and a processor configured to execute the instructions by accessing the memory, wherein the instructions cause the USB PDIC to control a voltage of the second pin to be less than a threshold voltage while maintaining communication through the first pin with the PD source based on a state of the electronic device when the USB PDIC determines that the first pin and the PD source are connected.

According to an example embodiment, a method of operating an electronic device includes: determining whether a first pin of a USB port of the electronic device is connected to a PD source; and controlling a voltage of a second pin of the USB port to be less than a threshold voltage while maintaining communication through the first pin with the PD source based on a state of the electronic device, when it is determined that the first pin and the PD source are connected, wherein a battery of the electronic device is configured to receive power supplied from the PD source through the second pin.

According to an example embodiment, a non-transitory computer-readable storage medium may store instructions that, when executed by an electronic device, cause the electronic device to: determine whether a first pin of a USB port of the electronic device is connected to a PD source; and control a voltage of a second pin of the USB port to be less than a threshold voltage while maintaining communication through the first pin with the PD source based on a state of the electronic device, when it is determined that the first pin and the power supply device are connected, wherein a battery of the electronic device is configured to receive power supplied from the PD source through the second pin.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
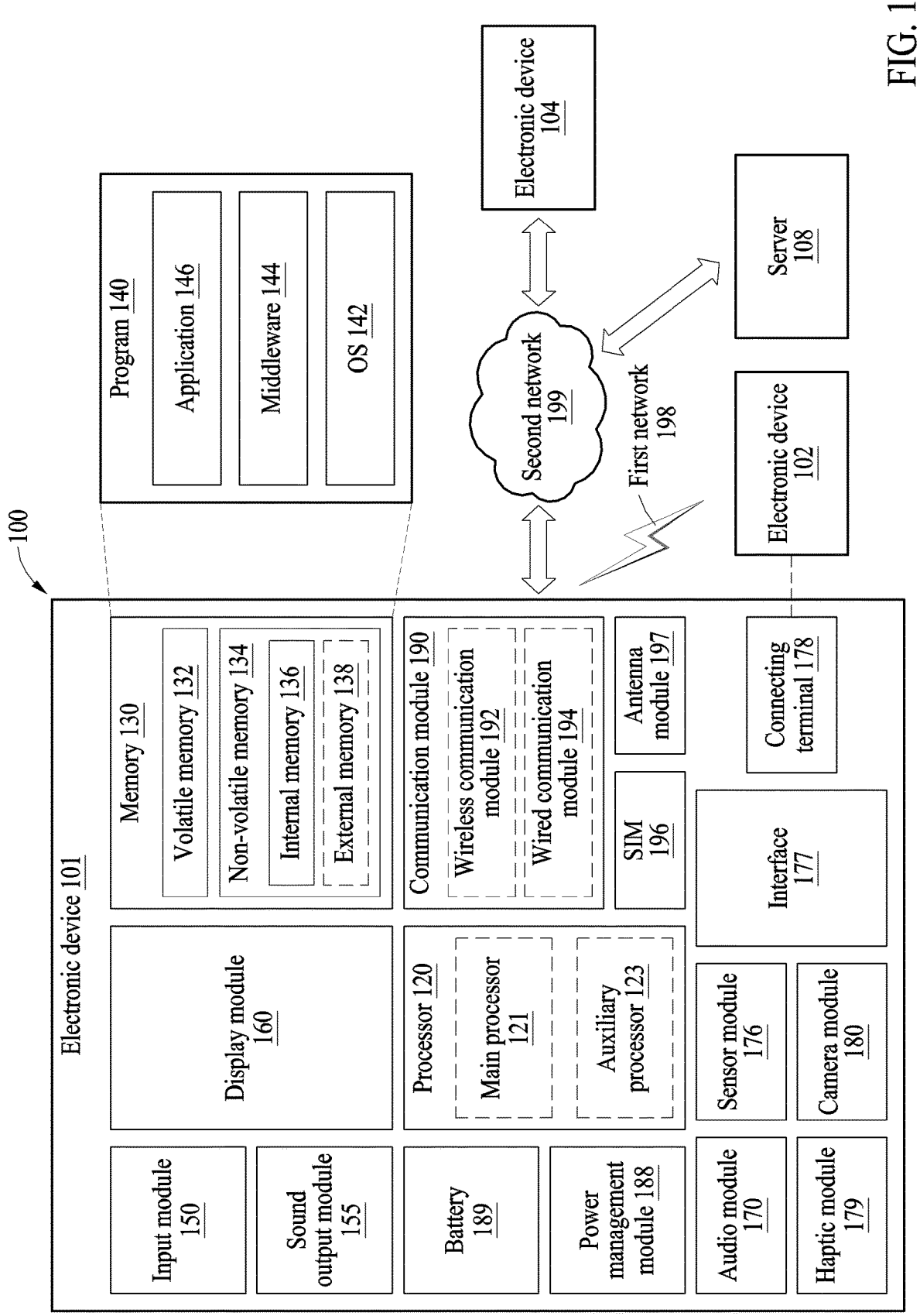
FIG. 1 is a block diagram illustrating an electronic device in a network environment according to an example embodiment.

Hereinafter, certain example embodiments will be described in greater detail with reference to the accompanying drawings. When describing the example embodiments with reference to the accompanying drawings, like reference numerals refer to like elements and a repeated description related thereto will be omitted.

According to certain example embodiments, an electronic device that monitors a state of the electronic device to control VBUS to be 0 V when power supply from a PD source is not required may be provided, so as to minimize standby power through CC communication control by controlling VBUS to be less than 5 V.

According to certain example embodiments, an electronic device that controls VBUS voltage of a PD source to 0 V based on a state of the electronic device may be provided. According to certain example embodiments, an electronic device that controls standby power through CC communication when VBUS voltage of a PD source is less than a threshold voltage may be provided.

<Electronic Device>

FIG. 1 is a block diagram illustrating an electronic device 101 in a network environment 100 according to an example embodiment.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to certain example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
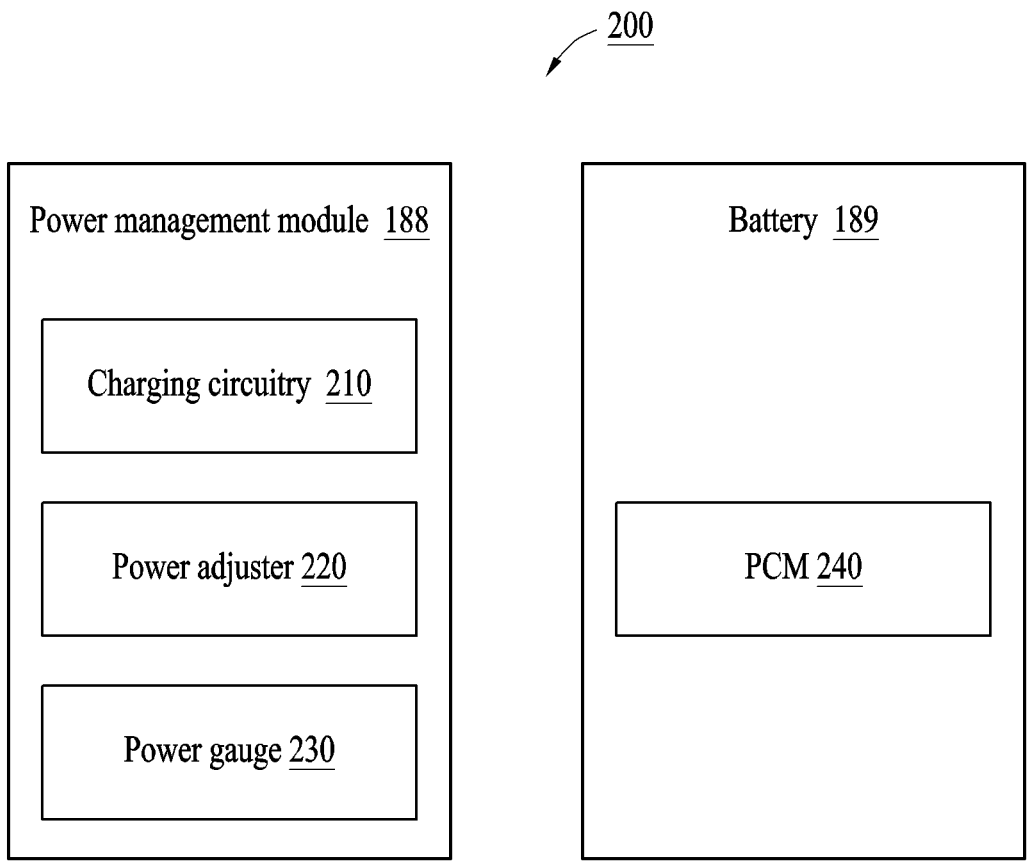
FIG. 2 is a block diagram of a power management module and a battery according to an example embodiment.

FIG. 2 is a block diagram 200 of a power management module 188 and a battery 189 according to an example embodiment.

Referring to FIG. 2, the power management module 188 may include charging circuitry 210, a power adjuster 220, or a power gauge 230. The charging circuitry 210 may charge the battery 189 using power supplied from an external power source outside the electronic device 101. According to an example embodiment, the charging circuitry 210 may select a charging scheme (e.g., normal charging or quick charging) based at least in part on the type of the external power source (e.g., power outlet, USB charger, or wireless charger), magnitude of power suppliable from the external power source (e.g., about 20 Watts or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting the voltage level or the current level of the power supplied from the external power source or the battery 189. The power adjuster 220 may adjust the voltage level or the current level of the power supplied from the external power source or the battery 189 into different voltage levels or current levels appropriate for each of the various components included in the electronic device 101. According to an example embodiment, the power adjuster 220 may be implemented in the form of a low drop out (LDO) regulator or a switching regulator. The power gauge 230 may measure use state information about the battery 189 (e.g., capacity, the number of times the battery has been charged or discharged, voltage, or temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an example embodiment, at least some of the functions of the power management module 188 may be performed by a control device not shown in FIG. 2 (e.g., the processor 120).

According to an example embodiment, the battery 189 may include a protection circuit module (PCM) 240. The PCM 240 may perform one or more of various functions (e.g., pre-cutoff function) to prevent performance deterioration of, or damage to, the battery 189. The PCM 240, additionally or alternatively, may be configured as at least part of a battery management system (BMS) capable of performing various functions including cell balancing, measurement of battery capacity, count of the number of charging or discharging cycles, measurement of temperature, or measurement of voltage.

According to an example embodiment, at least part of the charging state information or use state information regarding the battery 189 may be measured using an appropriate sensor (e.g., temperature sensor) of the sensor module 176, the power gauge 230, or the power management module 188. According to an example embodiment, the appropriate sensor (e.g., temperature sensor) of the sensor module 176 may be included as part of the PCM 240, or may be disposed near the battery 189 as a separate device.

The electronic devices according to certain example embodiments may be various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that certain example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Certain example embodiments as set forth herein may be implemented as software (e.g., the program 140) including one or more instructions that are stored in a storage medium (e.g., an internal memory 136 or an external memory 138) that is readable by a machine (e.g., the electronic device 101 of FIG. 1). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to certain example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain example embodiments, each component (e.g., a module or a program) of the above-described components may include a single entity or multiple entities, and some of the multiple entities may be separately disposed in different components. According to certain example embodiments, one or more of the above-described components may be omitted, or one or more other components may be added. Alternatively or additionally, a plurality of components (e.g., modules or programs) may be integrated into a single component. In such a case, according to certain example embodiments, the integrated component may still perform one or more functions of each of the plurality of components in the same or similar manner as they are performed by a corresponding one of the plurality of components before the integration. According to certain example embodiments, operations performed by the module, the program, or another component may be carried out sequentially, in parallel, repeatedly, or heuristically, or one or more of the operations may be executed in a different order or omitted, or one or more other operations may be added.

Figure 3:
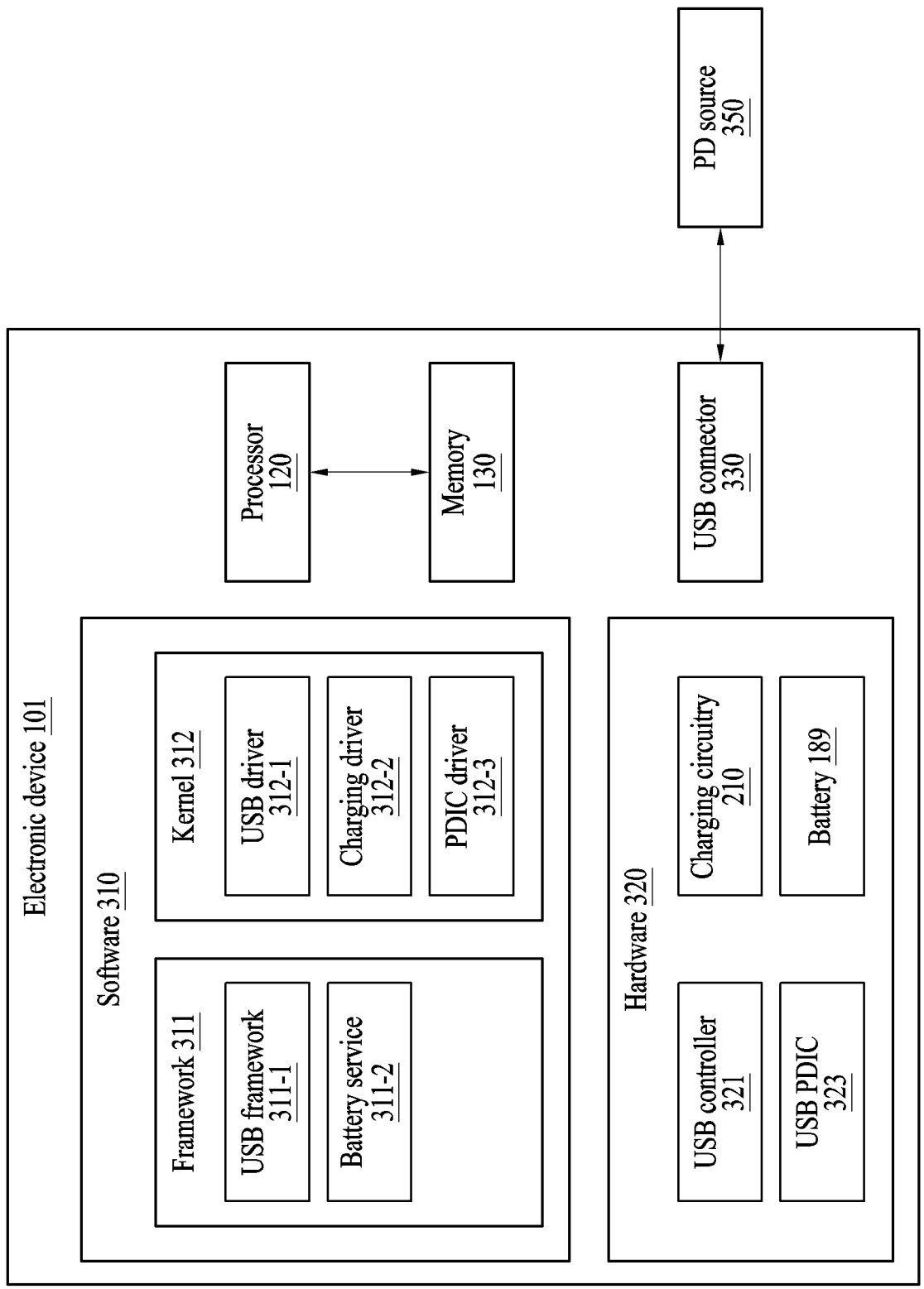
FIG. 3 is a block diagram illustrating an electronic device according to an example embodiment.

FIG. 3 is a block diagram illustrating an electronic device according to an example embodiment.

Referring to FIG. 3, the electronic device 101 may include software 310, hardware 320, a USB connector 330, a memory 130 configured to store computer-executable instructions, and a processor 120 configured to execute the instructions by accessing the memory 130. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an example embodiment, in the memory 130 of the electronic device 101, a program (e.g., the program 140 of FIG. 1) to control virtual bus (VBUS) voltage, which is the output voltage of a PD source 350 through a CC pin, to be less than a threshold voltage based on a state of the electronic device 101 may be stored as software. For example, an OS (e.g., the OS 142 of FIG. 1), middleware (e.g., the middleware 144 of FIG. 1) or an application 146 may be included in the memory 130. The instructions stored in the memory 130 may be implemented as one function module in the OS (e.g., the OS 142 of FIG. 1), implemented in the form of middleware (e.g., the middleware 144 of FIG. 1), or implemented in the form of a separate application 146.

According to an example embodiment, the software 310 may execute programs (e.g., the programs 140 of FIG. 1) such as applications (e.g., the applications 146 of FIG. 1) for an operation of the electronic device 101. The software 310 may include a framework 311 and a kernel 312.

According to an example embodiment, the framework 311 may be a collaborative environment of the software 310 provided such that design and implementation of parts of the software 310 may be reused or shared to facilitate the development of the application 146 of the software 310. The framework 311 may include a USB framework 311-1 controlling the USB connection that is used to connect with the PD source 350, and a battery service 311-2 controlling charging and/or discharging of a battery (e.g., the battery 189 of FIG. 1 or the battery 189 of FIG. 2) included in the electronic device 101.

According to an example embodiment, the kernel 312 may perform resource allocation for the program 140 running under control of the processor (e.g., processor 120 of FIG. 1) executing the OS (e.g., the OS 142 of FIG. 1). The kernel 312 may include a USB driver 312-1 establishing a USB connection, a charging driver 312-2 controlling a charging mode of the battery 189, and/or a power delivery integrated circuit (PDIC) driver 312-3 that detects resistance applied to the USB connector 330 and is responsible for power delivery (PD) communication when the PD source 350 is connected to the USB connector 330. The USB driver 312-1 according to an example embodiment may be executed by the processor 120. The USB driver 312-1 according to an example embodiment may be stored in the memory 130. That is, the USB driver 312-1 may be stored in the memory 130 and may be executed by the processor 120.

According to an example embodiment, the hardware 320 may be the physical components of the electronic device 101. The hardware 320 may include a USB controller 321, charging circuitry 210 (e.g., the charging circuitry 210 of FIG. 2), and a USB PDIC 323.

According to an example embodiment, the USB controller 321 may be included in the processor 120. The USB controller 321 may perform USB data communication using the D+ line and the D− line included in the USB connector 330.

According to an example embodiment, the charging circuitry 210 may be included in a PMIC (e.g., the power management module 188 of FIG. 1). The charging circuitry 210 may charge the battery 189 with power supplied from the PD source 350, which is an external power supply device outside the electronic device 101, via the VBUS line included in the USB connector 330, and the battery 189 may supply power to at least one component of the electronic device 101. According to an example embodiment, the charging circuitry 210 may convert power (e.g., 5 V or greater and 20 V or less) supplied from the PD source 350 and may output main power to be supplied to each component of the electronic device 101. According to an example embodiment, if the electronic device 101 is not connected to the PD source 350, the charging circuitry 210 may control power to be supplied from the battery 189 to each component of the electronic device 101.

According to an example embodiment, the USB PDIC 323 may be included in the power management module 188. The USB PDIC 323 may determine whether the USB PDIC 323 is connected to an external device (e.g., the PD source 350) and may perform bi-phase marked communication (BMC), through the CC pin included in the USB connector 330. The BMC may be single wire communication in which signals are transmitted and received using a single wire. According to an example embodiment, the USB PDIC 323 may control the VBUS voltage of the PD source 350 using the CC pin. Specifically, the processor 120 may monitor the state of the electronic device 101, and may control the USB PDIC 323 to control the VBUS voltage of the PD source 350 in response to a predetermined state.

According to an example embodiment, blocks included in the hardware 320 may be mapped to blocks included in the software 310, respectively. The USB driver 312-1, the charging driver 312-2, and/or the PDIC driver 312-3 may perform message transmission and/or communication with one another using notify messages or a callback function.

According to an example embodiment, the USB connector 330 may be connected to an external device, for example, the PD source 350, which in turn is also capable of USB connection. The USB connector 330 may be a USB port. The USB port may be a USB Type-C port. According to an example embodiment, the electronic device 101 may include an opening formed on one surface of its housing and a hole connected to the opening, and the USB connector 330 may be disposed in the hole. A connector of the PD source 350 may be inserted into the USB connector 330 of the electronic device 101, and may be electrically connected to the USB connector 330 due to the physical contact. According to an example embodiment, the USB connector 330 and the hole of the electronic device 101 may have a reversible structure.

According to an example embodiment, one surface of the connector of the PD source 350 may be inserted into the USB connector 330 of the electronic device 101 in a direction parallel to the front surface (e.g., the surface on which a display is located) of the electronic device 101. Similarly, another surface of the connector of the PD source 350 may be inserted in a direction parallel to the front surface of the electronic device 101.

According to an example embodiment, the PD source 350 may include a USB connector (not shown) and a USB PDIC (not shown), and may directly supply direct current (DC) power to the electronic device 101. The PD source 350 may be a device configured to supply power to each component of the electronic device 101 through a USB Type-C PD adapter, a USB Type-C multi-adapter, or an external electronic device (e.g., the electronic device 102 of FIG. 1). Certain example embodiments in which power is supplied from the PD source 350 to the electronic device 101 via the USB Type-C port will be described with reference to FIGS. 5A and 5B below.

According to an example embodiment, the USB connector 330 may be set at the lowest communication speed supported by the USB standard. The lowest communication speed may be about 1.5 Mbps, full speed may be about 12 Mbps, high speed may be about 480 Mbps, and/or super speed may be 5 Gbps or more. USB 2.0 may support up to the high speed. USB 3.0 or higher may support up to the super speed.

According to an example embodiment, when the USB PDIC 323 determines that the CC pin and the PD source 350 are connected, the processor 120 may control the VBUS voltage of the PD source 350 to be greater than or equal to a threshold voltage, for example, 5 V, through the CC pin, so that power may be supplied from the PD source 350 to the electronic device 101.

According to an example embodiment, when the processor 120 receives power supplied from the PD source 350, the USB PDIC 323 may control the VBUS voltage of the PD source 350 to be a voltage (e.g., 0 V) less than the threshold voltage (e.g., 5 V) while maintaining communication with the PD source 350 through the CC pin based on the state of the electronic device 101.

According to an example embodiment, when the electronic device 101 and the PD source 350 are connected through the USB Type-C port, the processor 120 may receive, from the PD source 350, information about whether the VBUS voltage is controllable to be less than the threshold voltage while maintaining communication between the electronic device 101 and the PD source 350 through the CC pin.

Specifically, the information about whether the VBUS voltage is controllable may be implemented as a bit added to a PD message transmitted from the PD source 350 to the electronic device 101 through the CC pin. According to an example embodiment, the PD message may include a preamble, a start of packet (SOP), a message header, a data object, a cyclic redundancy check (CRC), and an end of packet (EOP) in sequence. According to an example embodiment, the PD source 350 connected to the electronic device 101 may add one bit to the PD message to transmit the information about whether the VBUS voltage is controllable to be less than the threshold voltage while maintaining the communication through the CC pin to the electronic device 101. For example, if the VBUS voltage is controllable to be less than the threshold voltage while maintaining the communication through the CC pin with the PD source 350, the bit value may be set to "1" and the bit may be transmitted to the electronic device 101. Conversely, if the VBUS voltage is not controllable, the bit value may be set to "0" and the bit may be transmitted to the electronic device 101.

According to an example embodiment, if the USB PDIC 323 determines that the VBUS voltage is controllable to be less than the threshold voltage while maintaining the communication through the CC pin, the processor 120 may control the USB PDIC 323 to control the VBUS voltage of the PD source 350 to be a voltage (e.g., 0 V) less than the threshold voltage (e.g., 5 V) while maintaining the communication through the CC pin with the PD source 350 based on the state of the electronic device 101.

According to an example embodiment, when the electronic device 101 and the PD source 350 are connected via the USB port, the processor 120 may receive the information about whether the VBUS voltage is controllable to be less than the threshold voltage while maintaining the communication between the electronic device 101 and the PD source 350 through the CC pin. According to an example embodiment, to control the VBUS voltage to be less than the threshold voltage based on the state of the electronic device 101, the processor 120 may send a request for the information about whether the VBUS voltage is controllable to the PD source 350 and receive the information.

An operation in which the processor 120 controls the VBUS voltage of the PD source 350 based on the state of the electronic device 101 according to certain example embodiments will be described in detail with reference to FIG. 7 below.

Figure 4:
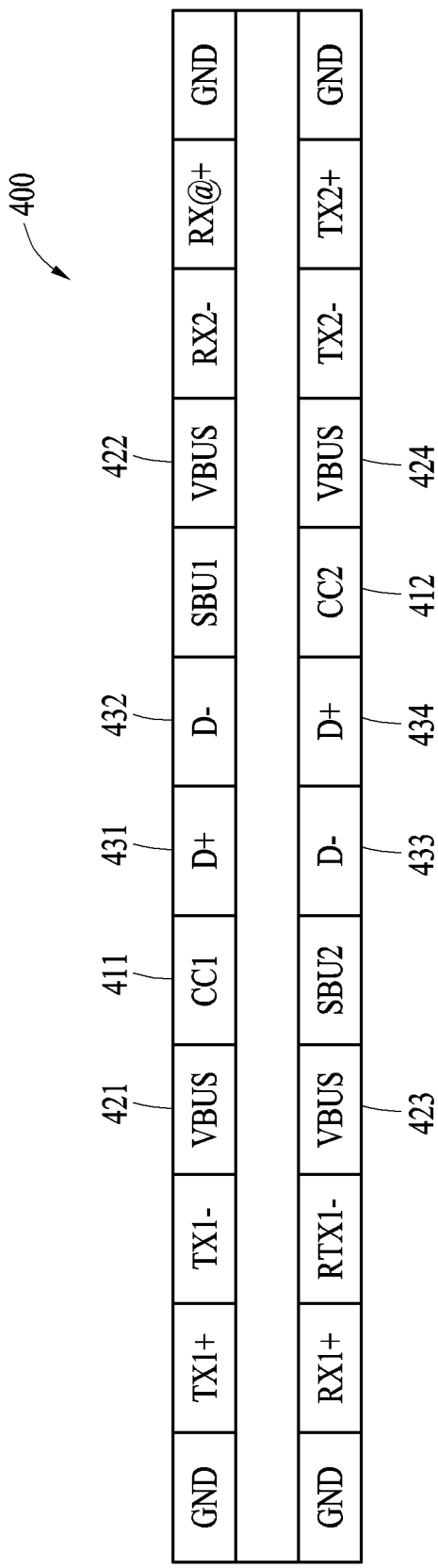
FIG. 4 is a diagram illustrating pins constituting a universal serial bus (USB) port according to an example embodiment.

FIG. 4 is a diagram illustrating pins constituting a USB port according to an example embodiment.

FIG. 4 illustrates pins 411, 412, 421, 422, 423, 424, 431, 432, 433, and 434 constituting a USB port 400 (e.g., the USB connector 330 of FIG. 3) according to an example embodiment. The USB port according to an example embodiment may be a USB Type-C port.

According to an example embodiment, the USB Type-C port may include 24 pins. The USB Type-C port (e.g., the USB connector 330 of FIG. 3) included in an electronic device (e.g., the electronic device 101 of FIG. 3) may include a receptacle structure having pins into which a terminal may be inserted. The USB Type-C port included in the PD source (e.g., the PD source 350 of FIG. 3) may include a plug structure having pins capable of being inserted into a terminal (e.g. the aforementioned receptacle). The USB Type-C port may include first pins 411 and 412, second pins 421, 422, 423, and 424, and/or third pins 431, 432, 433, and 434. According to an example embodiment, the first pins 411 and 412 may be CC pins.

The first pins 411 and 412 may include the CC1 pin 411 and the CC2 pin 412. The CC1 pin 411 and the CC2 pin 412 may detect the mounting state of the PD source 350, i.e., when the PD source 350 is connected using the USB Type-C port 330. The CC1 pin 411 and CC2 pin 412 may be used for communication between the USB PDIC (e.g., the USB PDIC 323 of FIG. 3) and the PD source 350 via the USB connector 330. The two first pins, e.g., the first pins 411 and 412, may be disposed to be symmetrical such that the top and the bottom of the USB cable are indistinguishable from each other, i.e. so that the USB cable is reversible.

According to an example embodiment, when a resistor Rp is recognized by the CC1 pin 411 and/or the CC2 pin 412, the electronic device 101 may operate in a USB client mode. The resistor Rp may be a resistor defined in the USB Type-C specification and may be, for example, about 10 kΩ.

According to an example embodiment, the second pins 421, 422, 423, and 424 may be VBUS pins. Power may be supplied from the external PD source 350 through the second pins 421, 422, 423, and 424.

According to an example embodiment, each of the third pins 431, 432, 433, and 434 may be a D+ pin or a D− pin. The third pins 431, 432, 433, and 434 may perform USB 2.0 interface communication.

According to an example embodiment, the USB Type-C port may further include pins TX1+, TX1−, TX2+, TX2−, RX1+, RX1−, RX2+, and RX2− that form a high-speed data path, auxiliary bus pins SBU1 and SBU2, and/or a ground pin GND.

Figure 5A:
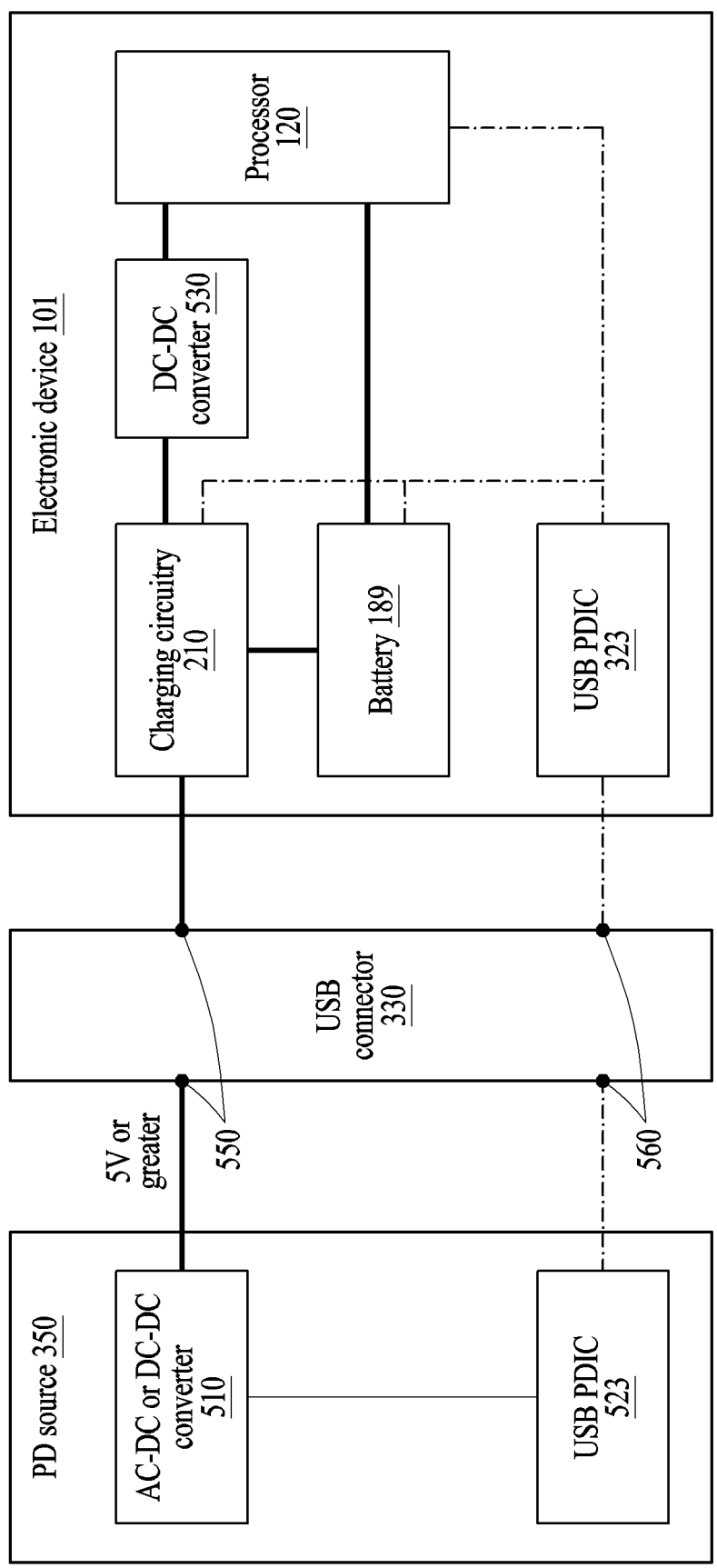
FIGS. 5A and 5B are diagrams illustrating an operation in which an electronic device receives power, according to an example embodiment.
Figure 5B:
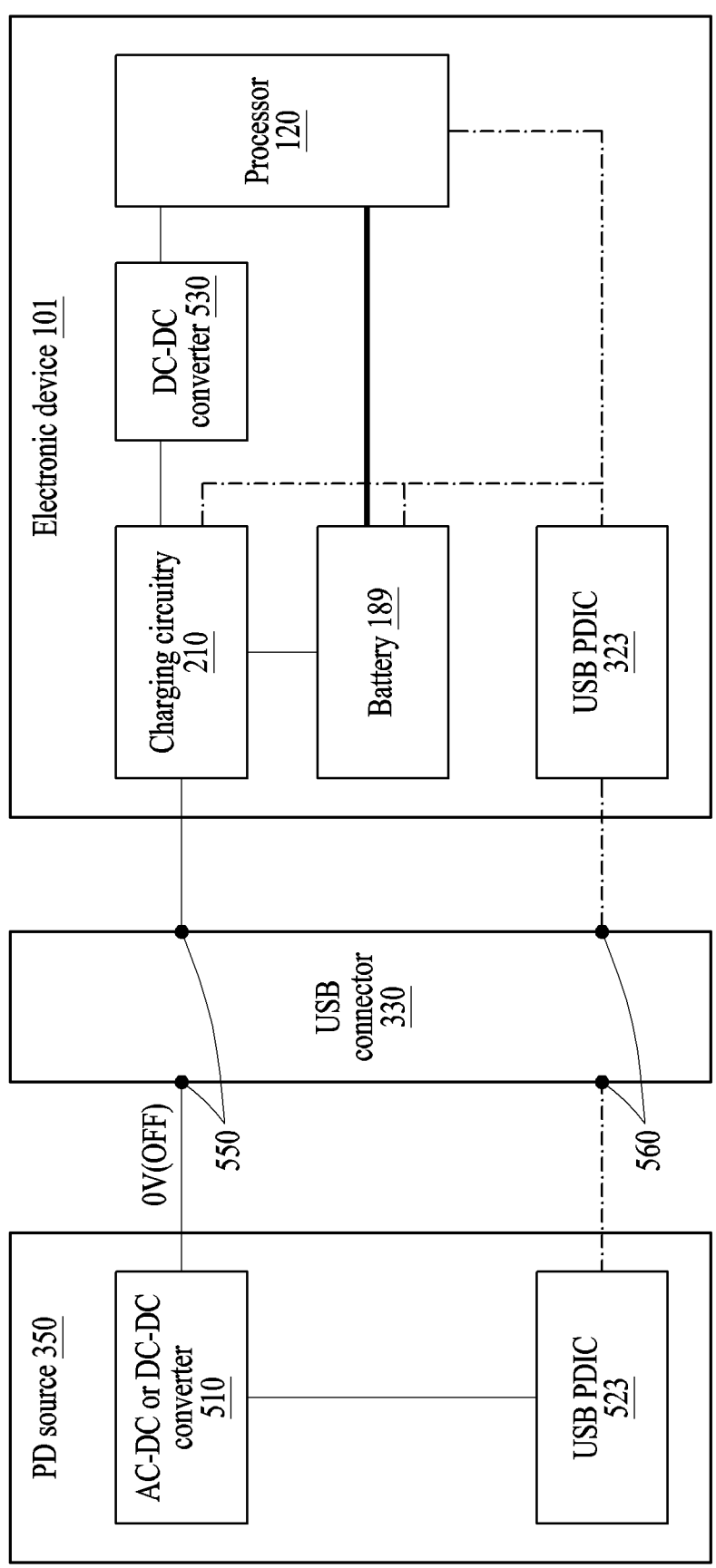

FIGS. 5A and 5B are diagrams illustrating an operation in which an electronic device 101 receives supplied power, according to certain example embodiments.

FIG. 5A illustrates an example in which the electronic device 101 and the PD source 350 outside the electronic device 101 are connected via the USB connector 330 and the electronic device 101 receives a VBUS voltage of 5 V or greater supplied from the PD source 350.

As described above with reference to FIGS. 3 and 4, the electronic device 101 and the PD source 350 may be connected through the 24 pins of the USB connector 330, and specifically, may perform PD-related communication through the CC pin (e.g., the CC pins 411 and 412 of FIG. 4), and power may be supplied through the VBUS pin (e.g., the VBUS pins 421, 422, 423, and 424 of FIG. 4). Referring to FIG. 5A, the USB connector 330 may include the VBUS pin 550 and the CC pin 560. Power supply through the VBUS pin is indicated by a bolded line, and PD communication through the CC pin is indicated by a dashed line.

According to an example embodiment, when the electronic device 101 and the PD source 350 are connected through the USB connector 330, the USB PDIC 323 of the electronic device 101 may determine, through the CC pin 560, whether the PD source 350 is connected through the USB connector 330. When the USB PDIC 323 determines that the USB connector 330 is connected to the PD source 350, the USB PDIC 323 may control the voltage of the VBUS pin 550, which is output through an analog current (AC)-to-DC or DC-to-DC converter 510 and the USB PDIC 523 of the PD source 350, to be greater than or equal to 5 V so that the communication through the CC pin 560 may be maintained.

According to an example embodiment, when the voltage of the VBUS pin 550 supplied from the PD source 350 is greater than or equal to 5 V, the electronic device 101 may receive power of 5 V or greater supplied through the charging circuitry 210, and convert the power using a DC-DC converter 530 so that the converted power may be supplied to various components of the electronic device 101. FIG. 5A illustrates power supply to the processor 120 of the electronic device 101 through the charging circuitry 210 and the DC-DC converter 530 for brevity of description, however, this is merely an example. For example, as described above with reference to FIG. 3, power may be supplied to each component of the electronic device 101.

According to an example embodiment, when the voltage of the VBUS pin 550 supplied from the PD source 350 is greater than or equal to 5 V, power may be supplied to each component of the electronic device 101 through the charging circuitry 210 and the battery 189 may also be charged.

According to an example embodiment, the charging circuitry 210 may include the DC-DC converter 530. For example, the charging circuitry 210 may include a buck converter, a boost converter, a buck-boost converter, and/or a Ćuk converter.

According to an example embodiment, in the basic USB Type-C power delivery operation as shown in FIG. 5A, the voltage of the VBUS pin 550 may be controlled to be in a range of 5 V to 20 V. However, conventionally since the voltage of the VBUS pin 550 needs to be maintained at 5 V or greater even though there is no need for power delivery through the VBUS, standby power may continue to be consumed.

FIG. 5B illustrates an example in which the electronic device 101 and the PD source 350 outside the electronic device 101 are connected via the USB connector 330, and in which the VBUS voltage received from the PD source 350 by the electronic device 101 is controlled to be less than a threshold voltage (e.g., 5 V).

As described above with reference to FIG. 5A, when the electronic device 101 is connected to the PD source 350 via the USB connector 330, the VBUS voltage may be maintained at 5V or greater. According to an example embodiment, in FIG. 5B, when it is determined that there is no need to maintain the voltage of the VBUS pin 550 to be greater than or equal to the threshold voltage (e.g., 5 V), based on a state of the electronic device 101 such as the charge level of a battery 189 and system power state, the processor 120 may control the VBUS voltage to be a voltage (e.g., 0 V) less than the threshold voltage.

According to an example embodiment, as described above with reference to FIG. 3, when the voltage of the VBUS pin 550 is designed to be controllable to be less than the threshold voltage while the electronic device 101 maintains communication through the CC pin 560 with the PD source 350 using the USB PDIC 523, the processor 120 may control the VBUS voltage to be less than the threshold voltage. Accordingly, the processor 120 may further perform an operation of receiving information about whether the VBUS voltage is controllable from the PD source 350.

As described above with reference to FIG. 3, in an example, when the electronic device 101 and the PD source 350 are connected, the information about whether the VBUS voltage is controllable may be included in a PD message and transmitted from the PD source 350 to the processor 120. In another example, when the processor 120 determines that there is no need to maintain the VBUS voltage to be greater than or equal to the threshold voltage, the information about whether the VBUS voltage is controllable may be obtained from the PD source 350 by sending a request for the information to the PD source 350. The PD message may be transmitted through the CC pin 560.

According to an example embodiment, when the voltage of the VBUS pin 550 is controllable to be less than the threshold voltage while the electronic device 101 maintains the communication through the CC pin 560 with the PD source 350, and when the processor 120 determines, based on the state of the electronic device 101, that there is no need to maintain the VBUS voltage to be greater than or equal to the threshold voltage, the VBUS voltage may be controlled to be a voltage (e.g., 0 V) less than the threshold voltage (e.g., 5 V) as shown in FIG. 5B.

According to an example embodiment, when the voltage of the VBUS pin 550 supplied from the PD source 350 is 0 V, the electronic device 101 may receive power through the battery 189, instead of the charging circuitry 210. As described above with reference to FIG. 5A, FIG. 5B illustrates that power is supplied from the battery 189 to the processor 120 for brevity of description, however, this is merely an example. For example, power may be supplied to each component of the electronic device 101 from the battery 189.

Unlike the power delivery operation described with reference to FIG. 5A, in the power delivery operation of FIG. 5B, since the voltage of the VBUS pin 550 is 0 V (OFF), standby power may be reduced. Table 1 below shows standby power in an example in which the VBUS voltage is controlled to 0 V according to an example embodiment. Referring to Table 1, if there is no VBUS OFF function, standby power may range from 400 millivolts (mV) to 1 watt (W). However, it can be found that when the processor 120 controls the VBUS voltage to be less than the threshold voltage, as described above, the standby power is reduced to 65 milliwatts (mW).

TABLE 1

| Power state | VBUS OFF function | Standby power |
| --- | --- | --- |
| ON mode | X | 400 mV to 1 W |
| | ○ (VBUS OFF function active) | 65 mW |
| Power-saving mode | ○ (VBUS OFF function active with fully charged battery) | 65 mW |
| Off mode | ○ (VBUS OFF function active with fully charged battery) | 65 mW |

Table 1 shows an example in which the power state of the electronic device 101 is the ON mode and the VBUS OFF function is active, and an example in which the power state is in a power-saving mode or OFF mode, the VBUS OFF function is active, and the battery is fully charged, however, this is merely an example. Various other embodiments may be possible. The operation in which the processor 120 controls the voltage of the VBUS pin 550 of the PD source 350 based on the state of the electronic device 101 according to an example embodiment will be described in detail with reference to FIG. 7 below.

<Method of Operating Electronic Device>

Figure 6:
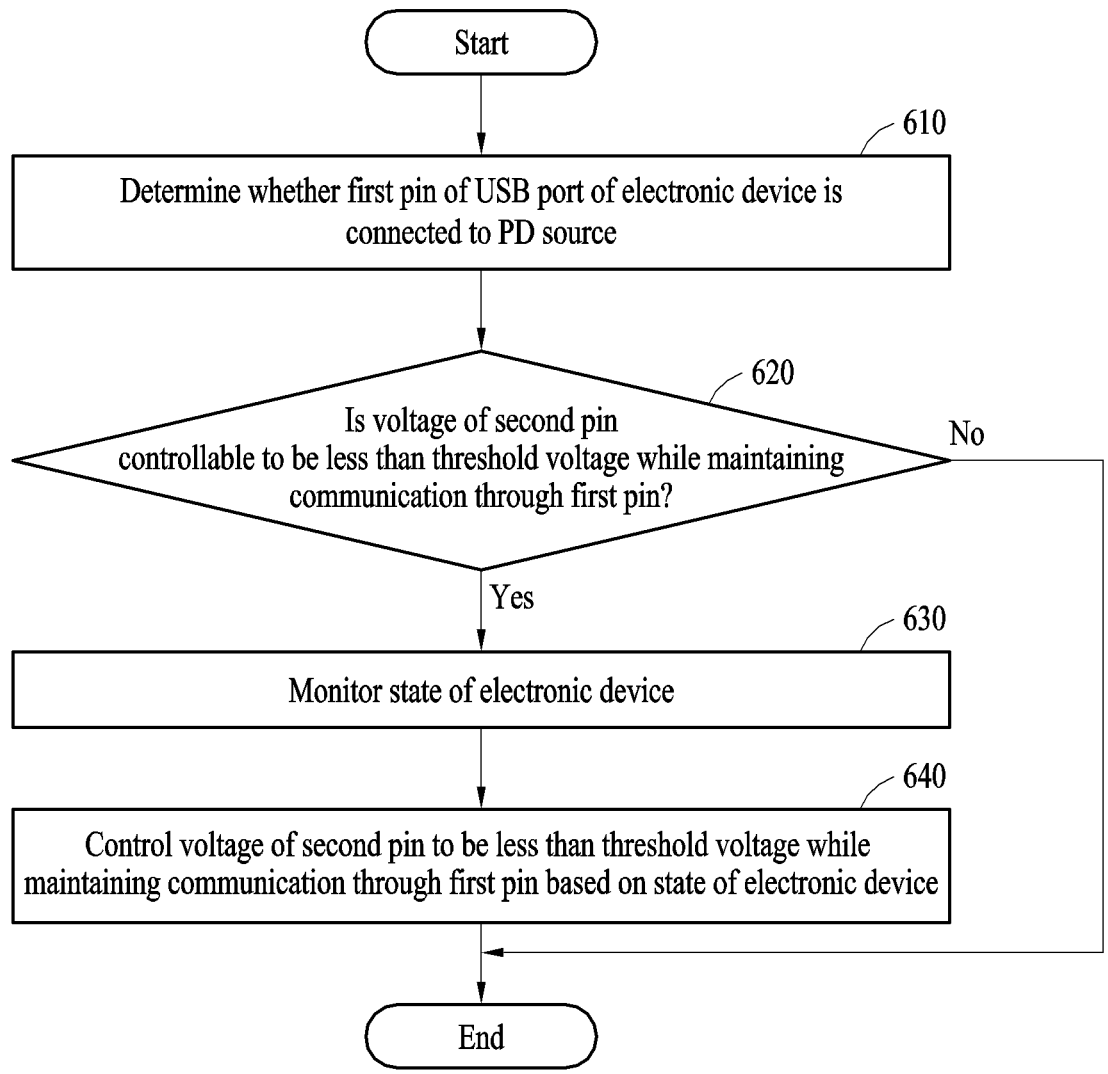
FIG. 6 is a flowchart illustrating an operation of an electronic device according to an example embodiment.

FIG. 6 is a flowchart illustrating an operation of an electronic device according to an example embodiment.

Operations 610 to 640 may be performed by the processor 120 of the electronic device 101 described above with reference to FIG. 3, and accordingly the description provided with reference to FIGS. 1 to 5B will not be repeated for conciseness.

According to an example embodiment, in operation 610, the processor 120 may determine whether a first pin of the USB port of the electronic device 101 is connected to the PD source 350. As described above with reference to FIG. 3, the processor 120 may determine whether the USB port and the PD source 350 are connected, through the USB PDIC 323. According to an example embodiment, the USB port may be a USB Type-C port, and the first pin may be a CC pin (e.g., the CC pins 411 and 412 of FIG. 4).

According to an example embodiment, when the USB PDIC 323 determines that the first pin and the PD source 350 are connected in operation 610, the processor 120 may determine whether the voltage of a second pin (e.g., the VBUS pin 550 of FIG. 5B) is controllable to be less than a threshold voltage while the electronic device maintains communication through the first pin (e.g., the CC pin 560 of FIG. 5B) with the PD source 350, using the USB PDIC 523 in operation 620. The second pin may be a VBUS pin (e.g., the VBUS pins 421, 422, 423, and 424 of FIG. 4). As described above with reference to FIGS. 3 and 5B, the processor 120 may determine whether the voltage of the second pin is controllable, based on a bit included in a PD message received from the PD source 350.

According to an example embodiment, when it is determined in operation 620 that the voltage of the second pin is controllable to be less than the threshold voltage while maintaining the communication through the first pin with the PD source 350, the processor 120 may monitor a state of the electronic device in operation 630. Although operation 630 is performed after operation 620 as shown in FIG. 6, the example embodiments are not limited thereto. For example, information about whether the voltage of the second pin is controllable to be less than the threshold voltage may be transmitted when the electronic device 101 and the PD source 350 are connected, as described above with reference to FIG. 3, or when the processor 120 determines that the voltage of the second pin needs to be less than the threshold voltage while monitoring the state of the electronic device 101 and sends a request for the information.

According to an example embodiment, in operation 630, the processor 120 may monitor the state of the electronic device 101 and determine whether to control the voltage of the second pin to be less than the threshold voltage while maintaining the communication through the first pin. According to an example embodiment, in operation 640, the processor 120 may control the voltage of the second pin to be less than the threshold voltage while maintaining the communication through the first pin based on a monitoring result obtained in operation 630.

Certain example embodiments in which the processor 120 monitors the state of the electronic device 101 and determines whether to control the voltage of the second pin to be less than the threshold voltage while maintaining the communication through the first pin in operation 630 will be described in detail with reference to FIG. 7 below.

Figure 7:
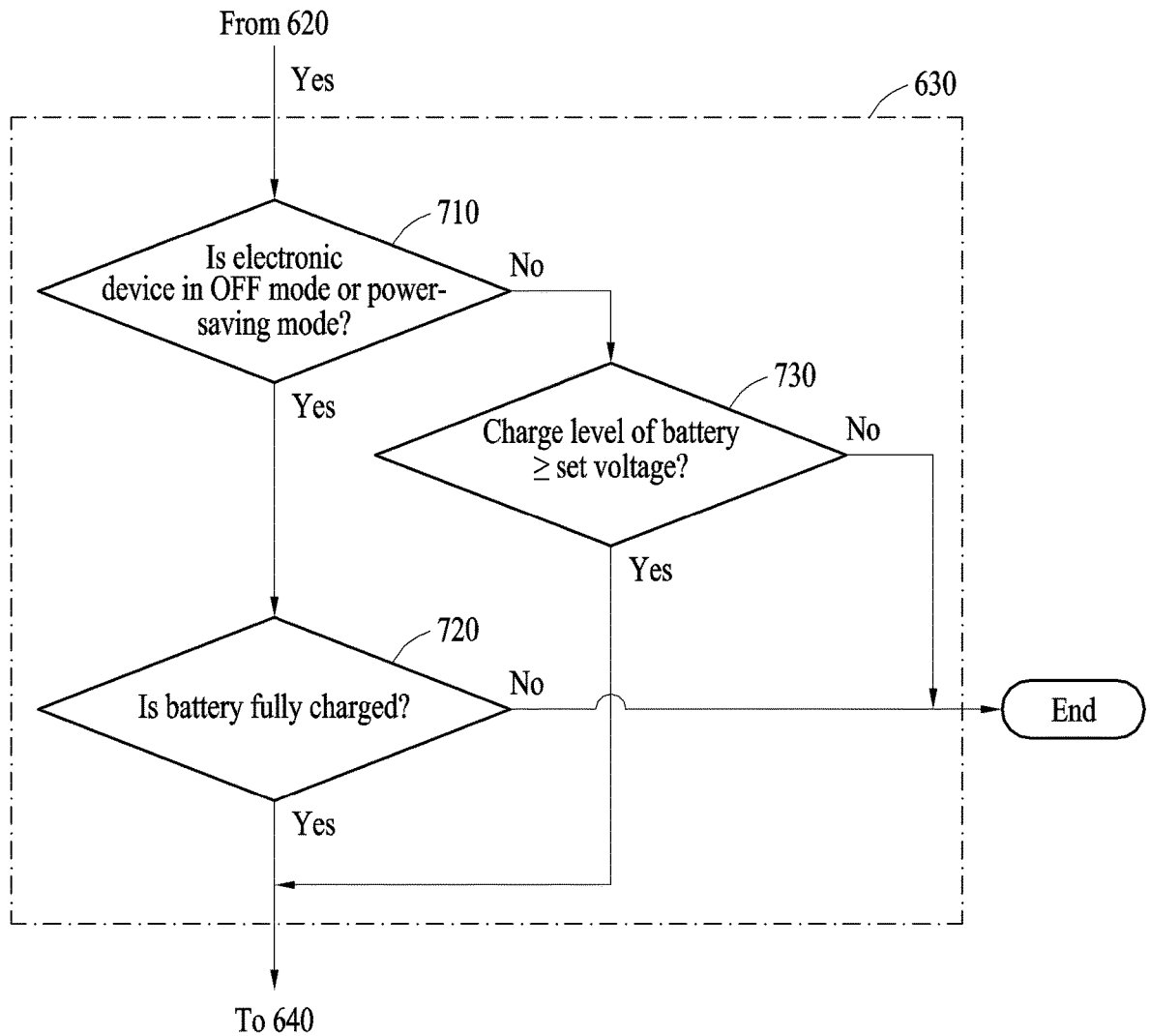
FIG. 7 is a flowchart illustrating an operation of controlling a virtual bus (VBUS) voltage based on a state of an electronic device according to an example embodiment.

FIG. 7 is a flowchart illustrating an operation of controlling a virtual bus (VBUS) voltage based on a state of an electronic device according to an example embodiment.

Operations 710 to 730 may be performed by the processor 120 of the electronic device 101 described above with reference to FIG. 3. According to an example embodiment, operations 710 to 730 may correspond to the operation (e.g., operation 630 of FIG. 6) of monitoring the state of the electronic device 101 described above with reference to FIG. 6.

According to an example embodiment, when it is determined in operation 620 that the voltage of the second pin is controllable to be less than the threshold voltage while the electronic device maintains the communication through the first pin with the PD source 350, the processor 120 may monitor the power state of the electronic device 101 and the charge level of the battery 189 to determine whether to control the voltage of the second pin to be less than the threshold voltage while maintaining the communication through the first pin. The first pin may be a CC pin (e.g., the CC pins 411 and 412 of FIG. 4), and the second pin may be a VBUS pin (e.g., the VBUS pins 421, 422, 423, and 424 of FIG. 4).

According to an example embodiment, in operation 710, the processor 120 may monitor the power state of the electronic device 101. The power state of the electronic device 101 may include, for example, an ON mode, a power-saving mode (e.g. sleep mode), and an OFF mode as shown in Table 1 described above with reference to FIG. 5B. The ON mode may refer to the mode in which the electronic device 101 operates, and the power-saving mode may be a low-power mode for saving power of the battery 189. The OFF mode may refer to the state of being powered off. For example, the power-saving mode may be a state in which at least one of components (e.g., the input module 150, the sound output module 155, the display module 160, the memory 130, the processor 120, the communication module 190 and/or the interface 177) of the electronic device 101 is powered off, a sleep state, or a low-power state.

According to an example embodiment, when the electronic device 101 is in the OFF mode or the power-saving mode in operation 710 and when the battery 189 is fully charged in operation 720, the processor 120 may determine that there is no need to receive power from the PD source 350 and control the voltage of the second pin to be less than the threshold voltage while maintaining the communication through the first pin, for optimization of standby power.

According to an example embodiment, when the charge level of the battery 189 is greater than or equal to a set voltage in operation 730, even though the electronic device 101 is in the ON mode, not in the OFF mode or the power-saving mode, in operation 710, the VBUS voltage through the PD source 350 may still be unnecessary, and the processor 120 may control the voltage of the second pin to be less than the threshold voltage while maintaining the communication through the first pin, for optimization of standby power.

According to an example embodiment, the set voltage of the battery 189 may refer to a set capacity of the battery 189. For example, operation 730 of determining whether the charge level of the battery 189 is greater than or equal to the set voltage may include determining whether the battery 189 is charged to a capacity greater than or equal to a set capacity.

The VBUS voltage according to an operation of the processor 120 in the example of FIG. 7 may be summarized as shown in Table 2 below.

TABLE 2

| Power state | Battery capacity | VBUS |
|---|---|---|
| ON mode | Less than set voltage | Greater than or equal to 5 V |
|  | Greater than or equal to set voltage | 0 V |
| Power-saving mode | 100% | 0 V |
| Off mode | 100% | 0 V |

According to an example embodiment, based on the determination of the processor 120 described with reference to FIG. 7, in operation 640, the voltage of the VBUS pin (e.g., the VBUS pin 550 of FIG. 5B) may be controlled to be a voltage (e.g., 0 V) less than the threshold voltage (e.g., 5 V) while the communication between the electronic device 101 and the PD source 350 through the CC pin (e.g., the CC pin 560 of FIG. 5B) is maintained. Thus, unnecessary standby power in the electronic device 101 may be reduced.

According to an example embodiment, an electronic device 101 may include: a USB PDIC 323 configured to determine whether a first pin (e.g., the CC pins 411 and 412 of FIG. 4) of a USB port of the electronic device is connected to a PD source 350; a charging circuitry 210 configured to charge a battery 189 of the electronic device 101 with power supplied from the PD source 350 through a second pin (e.g., the VBUS pins 421, 422, 423, and 424 of FIG. 4) of the USB port; a memory 130 configured to store computer-executable instructions; and a processor 120 configured to execute the instructions by accessing the memory 130.

According to an example embodiment, when the USB PDIC 323 determines that the first pin and the PD source 350 are connected, the instructions may cause the processor 120 to control a voltage of the second pin to be less than a threshold voltage while maintaining communication between the USB PDIC 323 and the PD source 350 through the first pin based on a state of the electronic device 101.

According to an example embodiment, when the USB PDIC 323 determines that the first pin and the PD source 350 are connected, the instructions may cause the processor 120 to receive information, from the PD source 350, about whether the voltage of the second pin is controllable to be less than the threshold voltage while maintaining the communication between the USB PDIC 323 and the PD source 350 through the first pin.

According to an example embodiment, the information may be included in a bit added to a message transmitted from the PD source 350 to the electronic device 101.

According to an example embodiment, when the electronic device 101 is powered off and when the battery 189 is fully charged, the instructions may cause the processor 120 to control the voltage of the second pin to be less than the threshold voltage while maintaining the communication between the USB PDIC 323 and the PD source 350 through the first pin.

According to an example embodiment, when the electronic device 101 is powered on and when a voltage of the battery 189 is greater than or equal to a set voltage, the instructions may cause the processor 120 to control the voltage of the second pin to be less than the threshold voltage while maintaining the communication between the USB PDIC 323 and the PD source 350 through the first pin.

According to an example embodiment, the instructions may cause the processor 120 to control the voltage of the second pin to be 0 V while maintaining the communication between the USB PDIC 323 and the PD source 350 through the first pin based on the state of the electronic device 101.

According to an example embodiment, the threshold voltage may be 5 V.

According to an example embodiment, the USB port may be a USB Type-C port, the first pin may be at least one of a CC1 pin and a CC2 pin, and the second pin may be a VBUS pin.

According to an example embodiment, a method of operating an electronic device 101 may include: determining whether a first pin (e.g., the CC pins 411 and 412 of FIG. 4) of a USB port of the electronic device 101 is connected to a PD source 350; and when it is determined that the first pin and the PD source 350 are connected, controlling a voltage of a second pin (e.g., the VBUS pins 421, 422, 423, and 424 of FIG. 4) of the USB port to be less than a threshold voltage while maintaining communication between the electronic device 101 and the PD source 350 through the first pin based on a state of the electronic device 101, wherein a battery 189 of the electronic device 101 is configured to receive power supplied from the PD source 350 through the second pin.

According to an example embodiment, the method may further include, when it is determined that the first pin and the PD source 350 are connected, receiving information, from the PD source 350, about whether the voltage of the second pin is controllable to be less than the threshold voltage (e.g., 5 V) while maintaining the communication between the electronic device 101 and the PD source 350 through the first pin.

According to an example embodiment, the information may be included in a bit added to a message transmitted from the PD source 350 to the electronic device 101.

According to an example embodiment, the voltage of the second pin may be controlled to be less than the threshold voltage when the electronic device 101 is powered off and when the battery 189 is fully charged.

According to an example embodiment, the voltage of the second pin may be controlled to be less than the threshold voltage when the electronic device 101 is powered on and when a voltage of the battery 189 is greater than or equal to a set voltage.

According to an example embodiment, the voltage of the second pin may be controlled to be 0 V.

According to an example embodiment, the threshold voltage may be 5 V.

According to an example embodiment, the USB port may be a USB Type-C port, the first pin may be at least one of a CC1 pin and a CC2 pin, and the second pin may be a VBUS pin.

According to an example embodiment, a non-transitory computer-readable storage medium may store instructions that, when executed by an electronic device, cause the electronic device 101 to: determine whether a first pin (e.g., the CC pins 411 and 412 of FIG. 4) of a USB port of the electronic device 101 is connected to a PD source 350; and when it is determined that the first pin and the PD source 350 are connected, control a voltage of a second pin (e.g., the VBUS pins 421, 422, 423, and 424 of FIG. 4) of the USB port to be less than a threshold voltage while maintaining communication between the electronic device 101 and the PD source 350 through the first pin based on a state of the electronic device 101, wherein a battery 189 of the electronic device 101 is configured to receive power supplied from the PD source 350 through the second pin.

According to an example embodiment, the instructions may further cause the electronic device 101 to, when it is determined that the first pin and the PD source 350 are connected, receive information, from the PD source 350, about whether the voltage of the second pin is controllable to be less than the threshold voltage while maintaining the communication between the electronic device 101 and the PD source 350 through the first pin.

According to an example embodiment, the instructions may cause the electronic device 101 to, when the electronic device 101 is powered off and when the battery 189 is fully charged, control the voltage of the second pin to be less than the threshold voltage while maintaining the communication between the electronic device 101 and the PD source 350 through the first pin.

According to an example embodiment, the USB port may be a USB Type-C port, the first pin may be at least one of a CC1 pin and a CC2 pin, and the second pin may be a VBUS pin.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a universal serial bus (USB) power delivery integrated circuit (PDIC) configured to perform communication with a power delivery (PD) source through a first pin of a USB port of the electronic device;
   a charging circuitry configured to charge a battery of the electronic device with power supplied from the PD source through a second pin of the USB port;
   memory storing computer-executable instructions; and
   at least one processor including processing circuitry,
   wherein the instructions, when executed by the at least one processor individually or collectively, cause the electronic device to:
   monitor a power state of the electronic device and a charge level of the battery in a state in which a voltage of the second pin is greater than or equal to a threshold voltage, and
   in response to the electronic device being powered off or being in a power-saving mode and the battery being fully charged, control the voltage of the second pin to be less than the threshold voltage while maintaining the communication between the USB PDIC and the PD source through the first pin.

2. The electronic device of claim 1, wherein, when the USB PDIC determines that the first pin and the PD source are connected, the instructions, when executed by the at least one processor individually or collectively, cause the electronic device to receive information, from the PD source, about whether the voltage of the second pin is controllable to be less than the threshold voltage while maintaining the communication between the USB PDIC and the PD source through the first pin.

3. The electronic device of claim 2, wherein the information is included in a bit added to a message transmitted from the PD source to the electronic device.

4. The electronic device of claim 1, wherein the controlling of the voltage of the second pin comprises when the electronic device is powered on and when a voltage of the battery is greater than or equal to a set voltage, controlling the voltage of the second pin to be less than the threshold voltage while maintaining the communication between the USB PDIC and the PD source through the first pin.

5. The electronic device of claim 1, wherein the controlling of the voltage of the second pin comprises controlling the voltage of the second pin to be 0 volts (V) while maintaining the communication between the USB PDIC and the PD source through the first pin based on the state of the electronic device.

6. The electronic device of claim 1, wherein the threshold voltage is 5 V.

7. The electronic device of claim 1, wherein:
   the USB port is a USB Type-C port,
   the first pin includes a configuration channel (CC) 1 pin and/or a CC2 pin, and
   the second pin is VBUS pin.

8. A method of operating an electronic device, the method comprising:
   receiving a power from a power delivery (PD) source through a second pin of a USB port of the electronic device;
   monitoring a power state of the electronic device and a charge level of a battery of the electronic device in a state in which a voltage of the second pin is greater than or equal to a threshold voltage; and
   in response to the electronic device being powered off or being in a power-saving mode and the battery being fully charged, controlling the voltage of the second pin to be less than the threshold voltage while maintaining communication between the electronic device and the PD source through a first pin of the USB port.

9. The method of claim 8, further comprising:
   when it is determined that the first pin and the PD source are connected, receiving information, from the PD source, about whether the voltage of the second pin is controllable to be less than the threshold voltage while maintaining the communication between the electronic device and the PD source through the first pin.

10. The method of claim 9, wherein the information is included in a bit added to a message transmitted from the PD source to the electronic device.

11. The method of claim 8, wherein the controlling of the voltage of the second pin comprises controlling the voltage of the second pin to be less than the threshold voltage when the electronic device is powered on and when a voltage of the battery is greater than or equal to a set voltage.

12. The method of claim 8, wherein the controlling of the voltage of the second pin comprises controlling the voltage of the second pin to be 0 volts (V).

13. The method of claim 8, wherein the threshold voltage is 5 V.

14. The method of claim 8, wherein:

the USB port is a USB Type-C port, the first pin includes a configuration channel (CC) 1 pin and/or a CC2 pin, and the second pin is VBUS pin.

15. A non-transitory computer-readable storage medium storing instructions that, when executed by an electronic device, cause the electronic device to:

receive a power from a power delivery (PD) source through a second pin of a USB port of the electronic device;

monitor a power state of the electronic device and a charge level of a battery of the electronic device in a state in which a voltage of the second pin is greater than or equal to a threshold voltage; and in response to the electronic device being powered off or being in a power-saving mode and the battery being fully charged, control the voltage of the second pin to be less than a threshold voltage while maintaining communication between the electronic device and the PD source through a first pin of the USB port.

16. The non-transitory computer-readable storage medium of claim 15, wherein the instructions further cause the electronic device to, when it is determined that the first pin and the PD source are connected, receive information, from the PD source, about whether the voltage of the second pin is controllable to be less than the threshold voltage while maintaining the communication between the electronic device and the PD source through the first pin.

17. The non-transitory computer-readable storage medium of claim 15, wherein:

the USB port is a USB Type-C port, the first pin includes a configuration channel (CC) 1 pin and/or a CC2 pin, and the second pin is VBUS pin.

* * * * *